United States Patent
Frijlink

(10) Patent No.: US 9,360,576 B2
(45) Date of Patent: Jun. 7, 2016

(54) METHODS AND APPARATUS FOR GENERATING DEGHOSTED SEISMIC DATA

(75) Inventor: Martijn Frijlink, Gravenhage (NL)

(73) Assignee: PGS Geophysical AS, Oslo (NO)

( * ) Notice: Subject to any disclaimer, the term of this patent is extended or adjusted under 35 U.S.C. 154(b) by 1030 days.

(21) Appl. No.: 13/458,269

(22) Filed: Apr. 27, 2012

(65) Prior Publication Data

US 2013/0286777 A1    Oct. 31, 2013

(51) Int. Cl.
  *G01V 1/36*    (2006.01)
  *G01V 1/38*    (2006.01)

(52) U.S. Cl.
  CPC ............. *G01V 1/364* (2013.01); *G01V 1/3808* (2013.01); *G01V 2210/44* (2013.01); *G01V 2210/56* (2013.01)

(58) Field of Classification Search
  CPC . G01V 1/364; G01V 1/3808; G01V 2210/44; G01V 2210/56
  USPC .......................................................... 367/24
  See application file for complete search history.

(56) References Cited

U.S. PATENT DOCUMENTS

| | | |
|---|---|---|
| 2011/0110189 A1 | 5/2011 | Riyanti et al. |
| 2012/0033526 A1 | 2/2012 | Hegna et al. |
| 2012/0039149 A1 | 2/2012 | van Borselen et al. |
| 2013/0182533 A1* | 7/2013 | Rentsch-Smith ........ G01V 1/38 367/24 |

FOREIGN PATENT DOCUMENTS

| | | |
|---|---|---|
| EP | 2330443 A2 | 6/2011 |
| EP | 2 420 865 A2 | 2/2012 |
| GB | 2 424 952 A | 10/2006 |

OTHER PUBLICATIONS

David Carlson, et al. "Increased resolution of seismic data from adual sensor streamer cable", SEG/San Antonio 2007 Annual Meeting, pp. 994-998.

Christina D. Riyanti, et al. "Pressure wave-field deghosting for non-horizontal streamers", SEG Las Vegas 2008 Annual Meeting, pp. 2652-2656.

Australian Patent Examination Report No. 1 issued in the prosecution of Patent Application No. 2013202467, mailed Dec. 20, 2013, 6 pages.

The extended European Search Report for Application No. 13165641.5 mailed, Feb. 19, 2015, 9 sheets.

* cited by examiner

*Primary Examiner* — Daniel L Murphy

(57) ABSTRACT

One embodiment relates to a method for deghosting seismic data from a marine seismic survey. The seismic data from the marine seismic survey is obtained, where the marine seismic survey was performed using multiple sub-sources towed at two or more different depths and fired at distinct time-delays. The seismic data is sorted into common receiver gathers, and the common receiver gathers are transformed from horizontal source coordinates to horizontal wavenumbers. For each selected frequency, a matrix operator is constructed, and an inversion procedure is applied to a system of equations based on the matrix operator to generate source-deghosted seismic data. Other embodiments, aspects and features are also disclosed.

20 Claims, 7 Drawing Sheets

500

METHODS AND APPARATUS FOR GENERATING DEGHOSTED SEISMIC DATA

BACKGROUND OF THE INVENTION

In seismic exploration, seismic data may be acquired by imparting acoustic energy into the Earth near its surface, and detecting acoustic energy that is reflected from boundaries between different layers of a subsurface rock formation. Acoustic energy is reflected when there is a difference in acoustic impedance between adjacent layers to a boundary. Signals representing the detected acoustic energy are interpreted to infer structures and composition of the subsurface rock formation structures.

In marine seismic exploration, a seismic energy source, such as an air gun, or air gun array, is typically used to impart the acoustic energy into the formations below the bottom of the water. The source is actuated at a selected depth in the water, typically while the source is being towed by a vessel. The same or a different vessel tows one or more seismic sensor cables, called "streamers", in the water. Generally the streamer extends behind the vessel along the direction in which the streamer is towed. Typically, a streamer includes a plurality of receivers or sensors, such as hydrophones, for example, disposed on the cable at spaced apart, known positions along the cable. Hydrophones, as is known in the art, are sensors that generate an optical or electrical signal corresponding to the pressure of the water or the time gradient of pressure in the water. The vessel that tows the one or more streamers typically includes recording equipment to make a record, indexed with respect to time, of the signals generated by the receivers in response to the detected acoustic energy. The record of signals may be processed to infer structures of and compositions of the earth formations below the locations at which the seismic survey is performed.

Marine seismic data include effects that limit the accuracy of inferring the structure and composition of the subsurface rock formations. For example, effects relating to "ghost" reflections arise because water has a substantially different density and propagation velocity of pressure waves than the air above the water surface. Removal of these effects may be accomplished by source deghosting and receiver deghosting.

When a source is actuated, acoustic energy radiates generally outwardly from the source. Half of the energy travels downwardly where it passes through the water bottom and into the subsurface rock formations. The other half of the acoustic energy travels upwardly from the source and most of this energy reflects from the water surface, whereupon it travels downwardly. The reflected acoustic energy will be delayed in time and also shifted in phase from the directly downward propagating acoustic energy. This surface-reflected, downwardly traveling acoustic energy may be referred to as the "source ghost" signal.

When the acoustic energy propagates back up to the receivers after being reflected by the sea bottom and any subterranean formations, a portion of the energy propagates directly to the receivers. Another portion of the energy passes the level of the receivers and is reflected from the water surface back down to the receivers. The surface-reflected downward-propagating acoustic energy will be delayed in time and also shifted in phase from the directly upward propagating acoustic energy. This surface-reflected acoustic energy may be referred to as the "receiver ghost" signal.

It is highly desirable to improve techniques for the deghosting of marine seismic data.

BRIEF DESCRIPTION OF THE DRAWINGS

The invention and its advantages may be more easily understood by reference to the following detailed description and the attached drawings, in which.

While the invention will be described in connection with one or more embodiments, it will be understood that the invention is not limited to these. On the contrary, the invention is intended to cover all alternatives, modifications, and equivalents that may be included within the scope of the invention, as defined by the appended claims.

DETAILED DESCRIPTION

Figure 1:
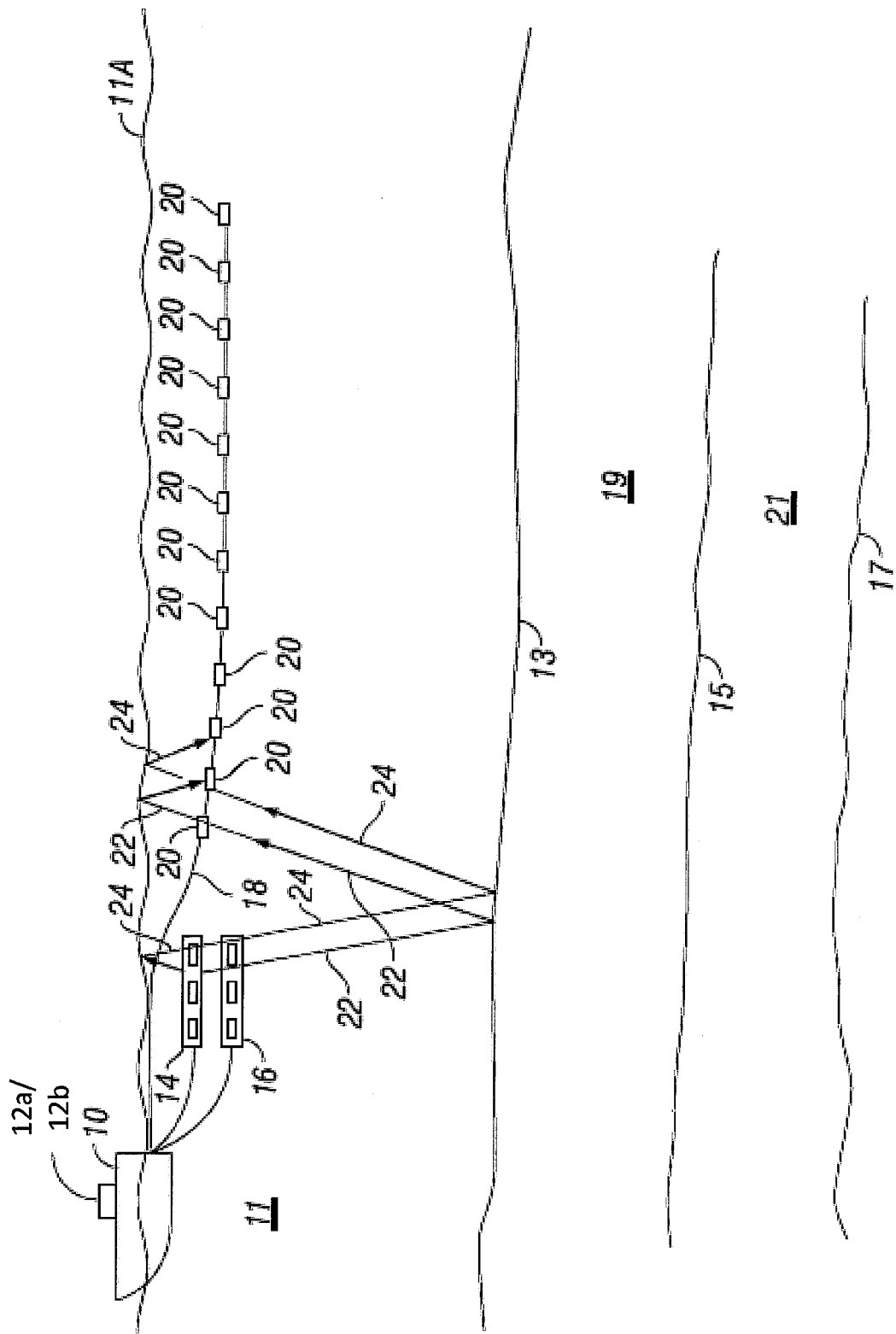
FIG. 1 shows a cross sectional view of an example arrangement for acquiring seismic data in accordance with an embodiment of the invention.

FIG. 1 shows in cross sectional view an example arrangement for acquiring seismic data in accordance with an embodiment of the invention. A seismic survey vessel 10 moves along the surface 11A of a body of water 11 such as a lake or the ocean.

The vessel 10 may include a control system 12a and a recording system 12b. The control system 12a and the recording system 12b may be separate systems that communicate data between each other, or they may be sub-systems of an integrated system. The control system 12a may be configured for selectively actuating seismic energy sub-sources (for example, sub-sources 14, 16), while the recording system 12b may be configured for recording the signals generated by sensors or receivers (for example, receivers 20) in response to the seismic energy imparted into the water 11 and thereby into subterranean material formations (e.g., rock formations 19, 21) below the water bottom 13. The recording system 12b may be further configured to determine and record the geodetic positions of the seismic energy sources and the plurality of seismic sensors or receivers at any time.

The example arrangement depicted in FIG. 1 depicts a seismic source which includes two seismic energy sub-sources (14, 16) for purposes of illustrative clarity. Embodiments of the presently-disclosed invention are intended to be employed with a plurality of two or more seismic energy sub-sources (and are not restricted to only two sub-sources).

Each sub-source (14, 16) may include a plurality of individually-controllable sub-source firing units in an array extending in the in-line and/or the cross-line directions. In the illustrative example of FIG. 1, three firing unit blocks are shown in each sub-source (14, 16). Each firing unit may include one or more marine energy source devices (such as air guns or water guns, for example), and each firing unit may be controllably actuated by the recording system. Actuating a sub-source generally involves actuating all of the firing units in the sub-source at the same moment in time. Embodiments of the presently-disclosed invention are intended to be employed with any multiplicity of sub-sources operating at two or more different depths.

As illustrated in the embodiment shown in FIG. 1, the sub-sources (14, 16) may be towed at substantially the same distance behind the vessel 10 and at different (distinct) depths in the water 11. Such an arrangement of the sub-sources may be referred to as an "over/under" arrangement. Note that, in an over/under arrangement, one sub-source is not typically directly below the other, although they may be so arranged. In other examples, the sub-sources may be towed at distinct depths by a separate vessel, or may be at distinct depths in a fixed position. Therefore, having the survey vessel 10 tow the sub-sources is not intended to be a limit on the scope of the presently-disclosed invention.

The vessel 10 is also shown towing a seismic streamer 18 having a plurality of longitudinally spaced-apart seismic receivers 20 thereon. Other seismic receiver arrangements may be used in other embodiments. For example, other embodiments may utilize towed seismic streamers in any configuration, ocean bottom cables, sensors deployed in boreholes, etc., and may utilize any type of receiving sensor, including, but not limited to, pressure sensors, pressure time gradient sensors, velocity sensors, accelerometers, etc., or any combination thereof. Measurement data from the receivers 20 may be sent to, or obtained by, the recording system 12.

At a selected time during operation of the acquisition system shown in FIG. 1, the control system 12a may be configured to actuate a first sub-source (for example, sub-source 14 may be actuated). The selected time may be indexed with respect to the start of recording of receiver responses or any other time reference related to signal recording time, and typically has a first selected delay from the start of recording. Energy from the first sub-source travels outwardly (for example, as shown at 22 and 24). Some of the energy travels downwardly (e.g., shown at 22), where it is reflected at acoustic impedance boundaries (for example, at the water bottom 13 and at the boundaries 15, 17 between different rock formations 19, 21). Only the water bottom reflections are shown in FIG. 1 for clarity of the illustration. Up-going portions of the energy from the first source array (for example, shown at 24), are reflected from the water surface (depicted at 11A).

The control system 12a may be configured to actuate the second sub-source, (for example, sub-source 16 may be actuated), at the end of a second time relative to the start of the seismic data recording, or, alternatively, after a selected time before or after the actuation of the first sub-source. Energy travelling outwardly from the second sub-source moves along similar paths as the energy from the first sub-source (though the paths begin at different depths due to the distinct depths of the sub-sources).

In accordance with an embodiment of the invention, the above described time delays are selected so that energy from at least one sub-source is detected by the receivers 20 in each data recording (called a shot record) that is stored by the recording system 12b. It is expected that the time of actuating the sub-sources at the two (or more) different depths may vary between shot records in a random, semi-random, or systematic manner.

Figure 2:
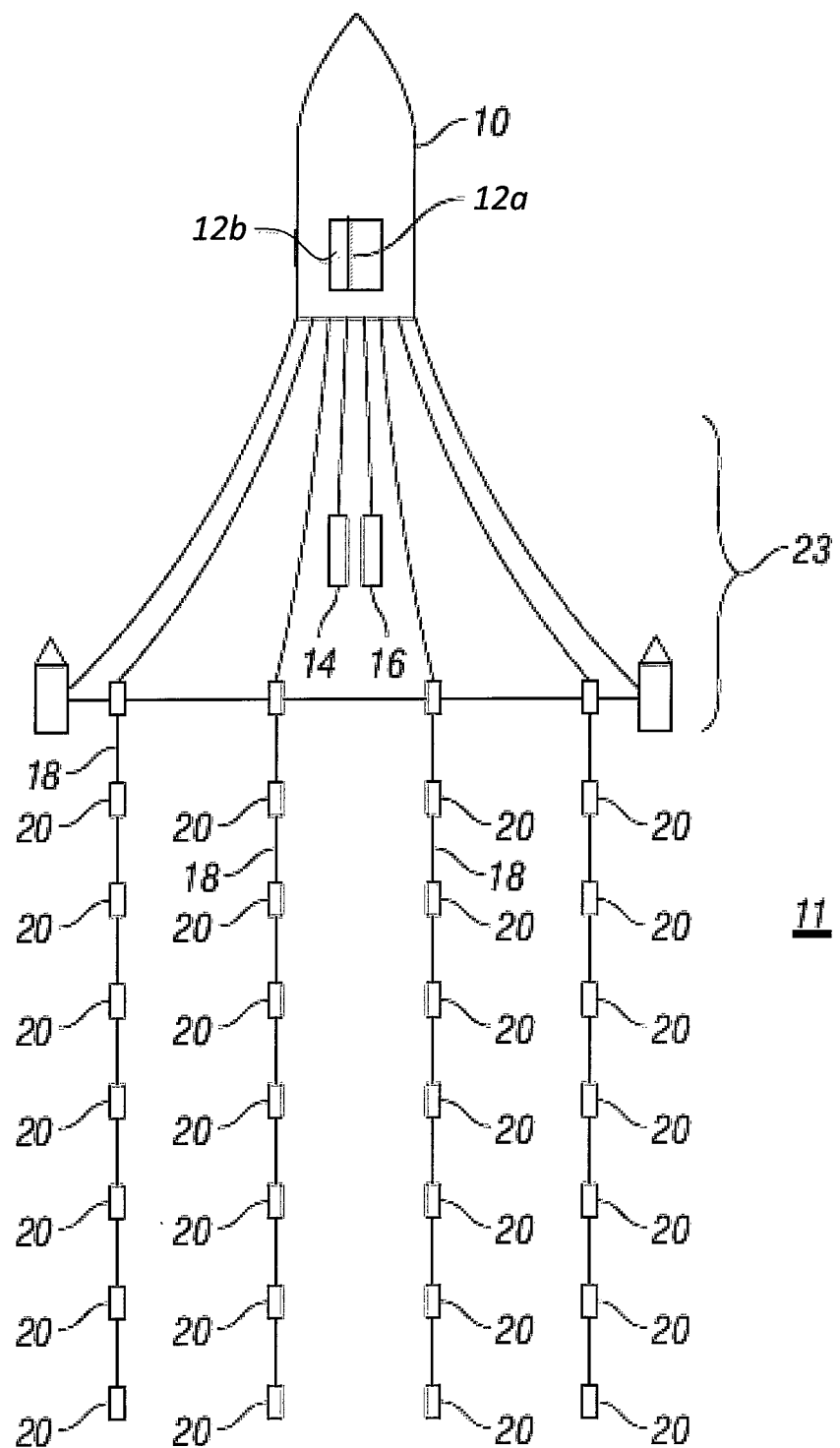
FIG. 2 shows a plan view of the example arrangement for acquiring seismic data in accordance with an embodiment of the invention.

FIG. 2 shows the arrangement of FIG. 1 in a plan view to illustrate towing a plurality of laterally spaced apart streamers 18. The streamers 18 can be maintained in their relative lateral and longitudinal positions with respect to the vessel 10 using towing equipment 23 of types well known in the art.

Again, the vessel 10 is shown as towing a seismic energy source having two sub-sources (14, 16), for purposes of illustrative clarity. As described above, embodiments of the presently-disclosed invention are intended to be employed with any multiplicity of sub-sources operating at two or more different depths. As depicted in FIG. 2, the sub-sources (14, 16) may be laterally displaced from each other in the cross-line direction (which is perpendicular to the in-line or sailing direction of the vessel 10).

In accordance with an embodiment of the invention, the horizontal (lateral and/or longitudinal) displacement between sub-sources is contemplated as being only a few meters, so that the sub-sources provide energy equivalent to being that which would occur if they were in the same vertical plane and at the same longitudinal distance behind the vessel, or expressed differently, at essentially the same geodetic position. By avoiding having dispersed air above the sub-sources when actuated, the effects of the water surface (11A in FIG. 1) on the energy emitted from each sub-source will be, adjusted for water depth, substantially the same as the effect thereof on the other sub-source(s).

The sub-source actuation and signal recording explained above may be repeated a plurality of times while the vessel, sub-sources, and streamers move through the water. Each shot record may include, for each receiver, signals corresponding to the seismic energy produced by the plurality of sub-sources (for example, as produced by both the first sub-source 14 and the second sub-source 16).

The seismic data obtained in performing a seismic survey, representative of the Earth's subsurface, may be processed to yield information relating to the geologic structure and properties of the subsurface earth formations in the area being surveyed. The processed seismic data may be further processed for display and analysis of potential hydrocarbon content of these subterranean formations. One goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the Earth in depth or time.

The image of the structure of the Earth's subsurface is produced in order to enable an interpreter to select locations with the greatest probability of having petroleum accumulations. To verify the presence of petroleum, a well is generally drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface. The processing and display of acquired seismic data facilitates more accurate decisions on whether and where to drill, and thereby reduces the risk of drilling dry holes.

Having explained an acquisition technique that may be used to obtain the seismic data, methods for deghosting seismic data will now be described.

Figure 3:
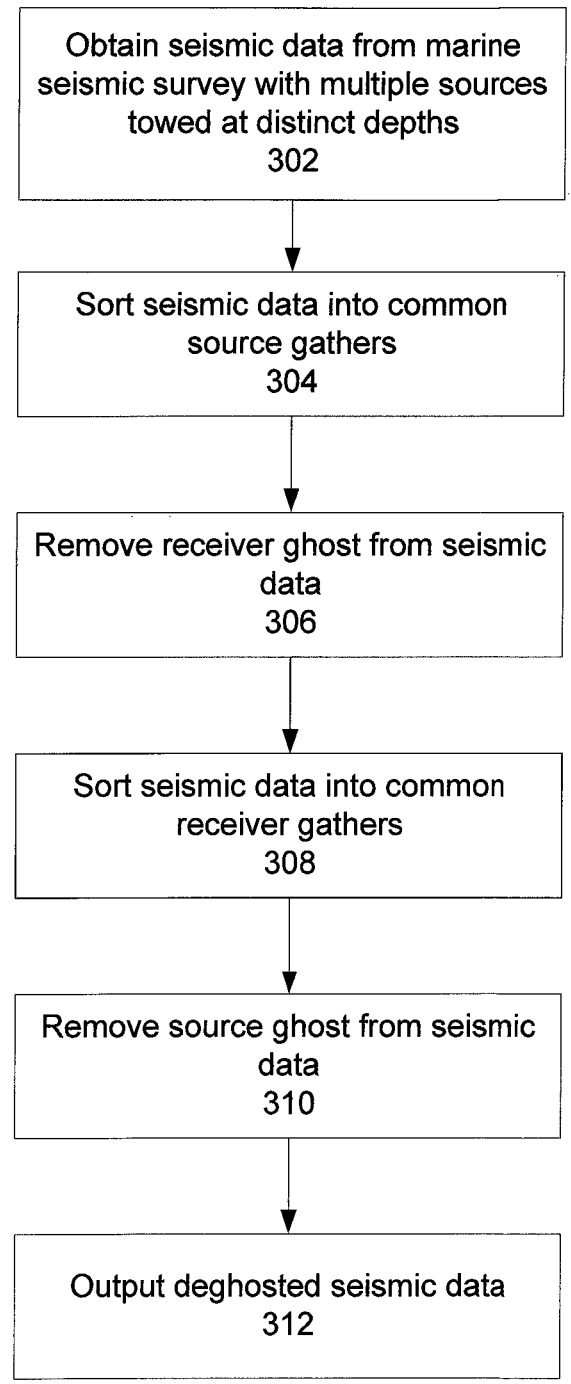
FIG. 3 is a flow chart of a first method for the deghosting of seismic data in accordance with an embodiment of the invention.

FIG. 3 is a flow chart of a method 300 for the deghosting of seismic data in accordance with an embodiment of the invention. While steps relevant to the deghosting process are shown in FIG. 3, it is to be understood that other data processing steps may also be performed. The seismic data may be acquired, for example, using the example arrangement described above in relation to FIGS. 1 and 2. The method 300 of FIG. 3 may be performed, for example, using the computer apparatus described below in relation to FIG. 7.

Per block 302, seismic data may be obtained from a seismic survey. The seismic survey may be a marine seismic survey. The marine seismic survey may be performed using a source comprising multiple sub-sources towed at two or more distinct depths. An example arrangement that may be used to perform such a marine seismic survey is described above in relation to FIGS. 1 and 2.

Per block 304, the seismic data may be sorted into common source gathers. All traces in the seismic data with a common source (and various different receivers) are collected (gathered) to form a common source gather. The common source may include multiple sub-sources which are located sufficiently close together to be treated as having a same source position.

Per block 306, a receiver ghost may be removed from the seismic data. The receiver ghost is a contribution to the seismic data that is due to seismic waveforms reflected from subterranean formations that is further reflected from the water-air interface (water surface 11A in FIG. 1) prior to being received by the seismic receivers. For example, one technique for removing a receiver ghost contribution is described in U.S. Patent Publication No. 2011/0110189, entitled "Method for Full-Bandwidth Deghosting of Marine Seismic Streamer Data" by Christina Riyanti, et al. (hereinafter, the "Riyanti publication"), the disclosure of which is herein incorporated by reference in its entirety. Note that the Riyanti publication applies to data acquired using conventional streamers where the depth varies along the streamer length. Other techniques for removing the receiver ghost contribution may also be applied depending on the data acquisition technology used. For example, a technique for removing the receiver ghost contribution from seismic data acquired from a dual sensor streamer cable is described in "Increase resolution of seismic data from a dual sensor streamer cable," David Carlson, et al., SEG/San Antonio 2007 Annual Meeting, the disclosure of which is hereby incorporated by reference in its entirety.

Per block 308, the seismic data may be sorted (or re-sorted) into common receiver gathers. All traces in the seismic data with a common receiver (and various different source locations) are collected (gathered) to form a common receiver gather.

Figure 4:
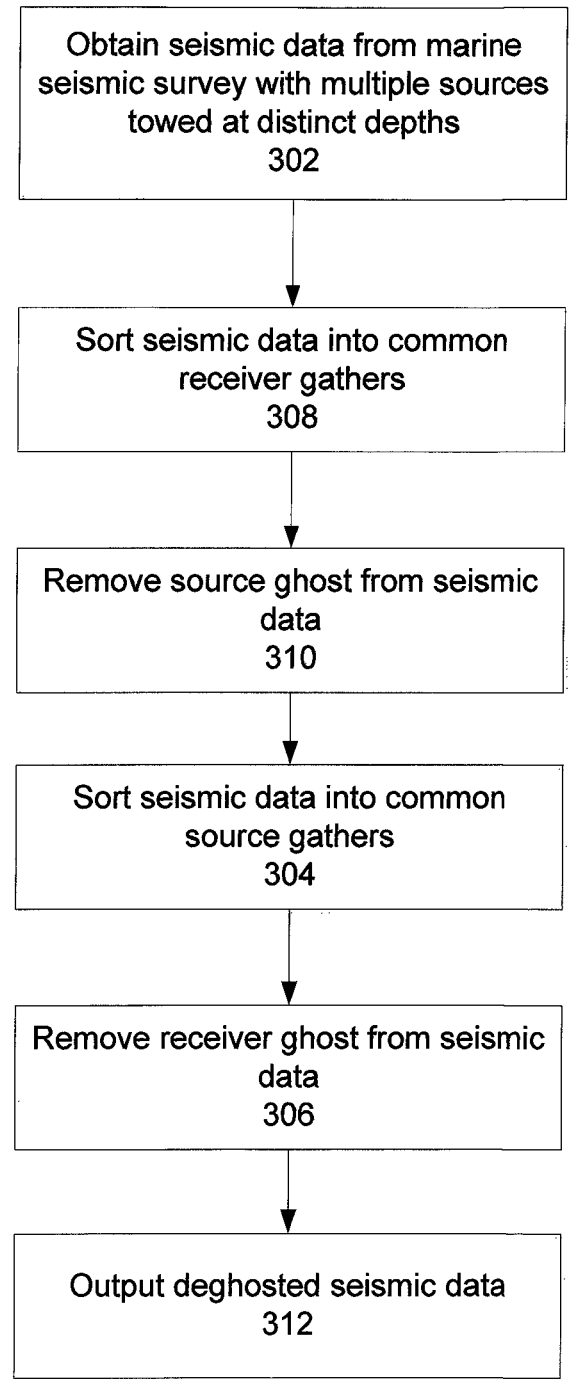
FIG. 4 is a flow chart of a second method for the deghosting of seismic data in accordance with an embodiment of the invention.

Per block 310, a source ghost may be removed from the seismic data. The source ghost is a contribution to the seismic data that is due to portions of the source waveforms that are reflected from the water-air interface (water surface 11A in FIG. 1) prior to traveling downward toward the subterranean formations. An advantageous procedure 600 for source ghost removal is described further below in relation to FIG. 6. FIG. 4 is a flow chart of a second method 400 for the deghosting of seismic data in which first the source ghost is removed before removing the receiver ghost in accordance with an embodiment of the invention. The method 400 of FIG. 4 may be performed, for example, using the computer apparatus described below in relation to FIG. 7.

In accordance with the method 300 of FIG. 3, the blocks 304 and 306 relating to receiver deghosting are performed prior to the blocks 308 and 310 relating to source deghosting.

In contrast, in accordance with the method 400 of FIG. 4, the blocks 308 and 310 relating to source deghosting are performed before blocks 304 and 306 relating to receiver deghosting. In other words, while the method 300 of FIG. 3 performs receiver deghosting and then source deghosting, the method 400 of FIG. 4 performs source deghosting and then receiver deghosting.

Figure 5:
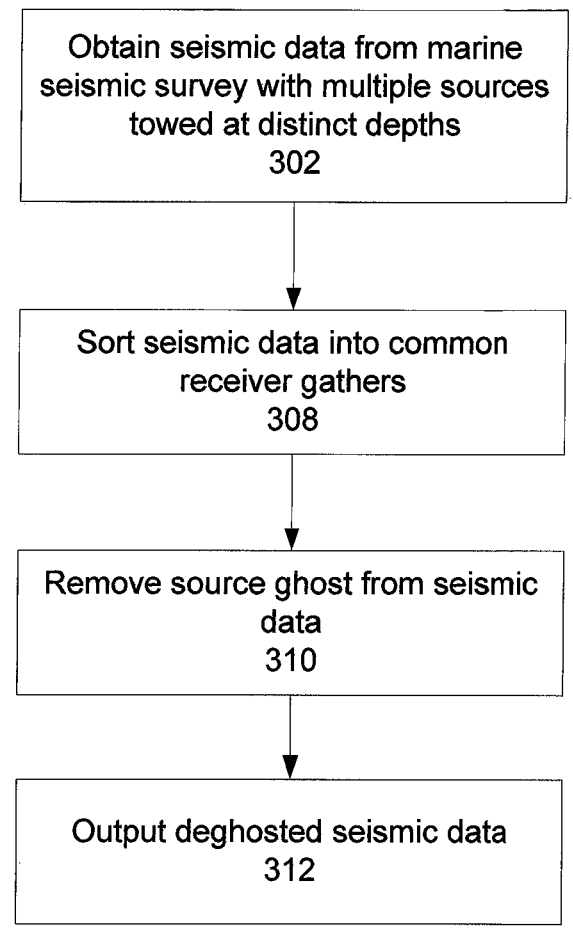
FIG. 5 is a flow chart of a third method for the deghosting of seismic data in accordance with an embodiment of the invention.

FIG. 5 is a flow chart of a third method 500 for deghosting of seismic data in which the source ghost is removed in accordance with an embodiment of the invention. The method 500 of FIG. 5 may be performed, for example, using the computer apparatus described below in relation to FIG. 7.

In accordance with the method 500 of FIG. 5, blocks 308 and 310 relating to source deghosting are performed, but not blocks 304 and 306 relating to receiver deghosting. In other words, the method 500 of FIG. 5 performs source deghosting and not receiver deghosting. After removal of the source ghost per block 310, the deghosted seismic data is output per block 312.

Figure 6:
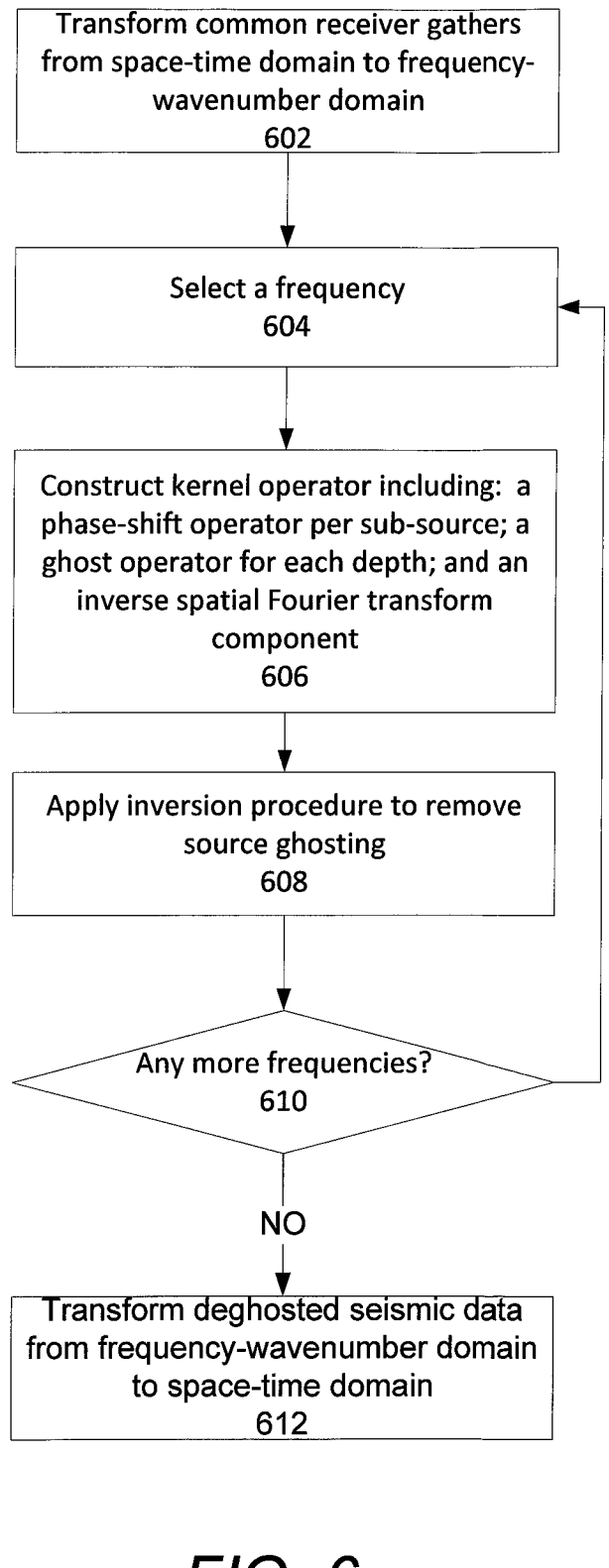
FIG. 6 is a flow chart of a procedure for source ghost removal from seismic data in accordance with an embodiment of the invention.

FIG. 6 is a flow chart of a procedure 600 for source ghost removal from seismic data in accordance with an embodiment of the invention. The procedure 600 in FIG. 6 may be applied to implement block 310 in any of FIGS. 3 through 5. Furthermore, the procedure 600 of FIG. 6 may be applied to different types of seismic data, including single-sensor seismic data and dual-sensor seismic data, for example.

Per block 602, the common receiver gathers may be transformed from space-time domain to the frequency-wavenumber domain. For example, the in-line horizontal source coordinate $x_l$ may represent the horizontal position in the in-line direction of shot position l, and the horizontal wave number $k_m$ may represent the horizontal wave number corresponding to the source coordinate. At each source coordinate $x_l$, all sub-sources, numbered 1 to $N^s$, where $N^s$ is the total number of sub-sources, may be fired or actuated with fire-time delays as described herein. The vessel 10 is moving, so that each sub-source is displaced in the sailing (also known as the in-line) direction with respect to the other sub-sources when it is actually fired. This displacement may be ignored due to the small differences in firing times between the sub-sources for the same shot, so that the position at which all different sub-sources are actuated may be considered to be effectively the same for the same "shot" during which data is gathered.

Per block 604, a frequency $\omega$ may be selected from a range of frequencies. The next blocks (606 and 608) are then performed to remove source ghosting from the selected frequency of the seismic data.

Per block 606, a matrix operator for use in source deghosting may be constructed. In accordance with an embodiment of the invention, the source-deghosting matrix operator may include the following components: an inverse spatial Fourier transform operator; a time-delay phase-shift operator per sub-source; and a ghost operator per sub-source.

In one implementation, the source-deghosting matrix operator $K(x_l; k_m)$ may be given by the following equation.

$$K(x_l; k_m) = Ae^{-jk_m x_l} \sum_{d=1}^{N^s} 2\sin(\Gamma_m z_{l,d}) e^{-j\omega \Delta t_{l,d}} \qquad \text{(Eqn. 1)}$$

Per Eqn. 1, the inverse spatial Fourier transform operator is given by the component $e^{-jk_m x_l}$. The summation in Eqn. 1 is over all sub-sources d, such that $d=1$ to $N^s$, where $N^s$ is the total number of sub-sources. The depths $z_{l,d}$ for $d=1$ to $N^s$ obey $z_{l,1} < z_{l,2} < \ldots < z_{l,N^s}$. The summand within the summation is the ghost operator per sub-source d multiplied by the time-delay phase-shift operator per sub-source d. The ghost operator for sub-source d at shot position l is given by $2\sin(\Gamma_m z_{l,d})$, where $\Gamma_m = \sqrt{(\omega/c)^2 - k_m^2}$ is the vertical wave number, and $z_{l,d}$ is the depth of sub-source d at shot position l. The time-delay phase-shift operator for sub-source d at shot position l is given by $e^{-j\omega\Delta t_{l,d}}$, where j is the imaginary unit number, ω is the frequency, and $\Delta t_{l,d}$ is the fire-time delay of sub-source d at shot position l in relation to the firing time of sub-source 1 at the same shot position l. Under this definition, the fire-time delay of sub-source 1 at any shot position l is zero. The fire-time delay of sub-source d>1 at shot position l may be positive and distinct (different) from the fire time-delays of the other sub-sources d at the same shot position l. With those constraints, the fire-time delays of the sub-sources may vary randomly for all shot positions l=1, 2, 3, . . . , N. The scalar A is a proportionality constant per Fourier theory.

Per block 608, an inversion procedure may be applied to a system of equations based on the matrix operator to generate deghosted seismic data. In accordance with an embodiment of the invention, the system of equations based on the matrix operator $K(x_l; k_m)$ may be given by the following equation.

$$P^{r.dgh}(x_l) = \sum_{m=1}^{N^k} K(x_l; k_m) \tilde{P}^{dgh}(k_m) \quad \text{(Eqn. 2)}$$

In Eqn. 2, $P^{r.dgh}(x_l)$ is the known seismic data related to the source fired at $x_l$, without the receiver ghost but still containing the source ghost. In other words, $P^{r.dgh}(x_l)$ is the known seismic data after receiver deghosting but before source deghosting. The receiver deghosting is indicated by the superscript r.dgh. The summation is over the horizontal wavenumbers $k_m$, such that m=1 to $N_k$, where $N_k$ is the total number of wavenumbers. The summand within the summation is the product of the matrix operator $K(x_l; k_m)$ and $\tilde{P}^{dgh}(k_m)$, where $\tilde{P}^{dgh}(k_m)$ is the unknown seismic data which is both receiver deghosted and source deghosted. The full deghosting is indicated by the superscript dgh.

Eqn. 2 may be recast as the matrix-vector expression given below in Eqn. 3.

$$P = K\tilde{P} \quad \text{(Eqn. 3)}$$

In Eqn. 3, the scalars $P^{r.dgh}(x_l)$ are combined into a N-vector P. The scalars $\tilde{P}^{dgh}(k_m)$ are combined into a $N^k$-vector $\tilde{P}$. The scalars $K(x_l; k_m)$ are combined into a $N \times N^k$-matrix K. The ghost-free data is obtained by solving Eqn. 3 for $\tilde{P}$ using an inversion technique. For example, a conjugate gradient scheme may be performed to solve Eqn. 3 for $\tilde{P}$. An example implementation of a conjugate gradient scheme is described in further detail in the above-referenced Riyanti publication.

A determination 610 may then be made as to whether or not there are any further frequencies to process to remove source ghosting. If there is a further frequency to process, then the method 600 may loop back to block 604 and selects another frequency ω to process and then continues to perform blocks 606 and 608 for that frequency. If there are no further frequencies to process, then the method 600 may move on to block 612.

Finally, per block 612, the deghosted seismic data $\tilde{P}^{dgh}(k_m)$ is transformed back from the frequency-wavenumber domain to the space-time domain. In other words, the deghosted seismic data is transformed from $\tilde{P}^{dgh}(k_m)$ to $\tilde{P}^{dgh}(x_l)$.

Unlike conventional technology for removing the source ghost from the acquired data, the method 600 described above in relation to FIG. 6 does not require source separation prior to deghosting to account for the fire-time delays. Instead, the method 600 provides a novel integrated processing procedure such that the source deghosting may be applied to the blended data. This advantageously reduces the need for user interaction during the data processing.

In addition, the method 600 may be performed on seismic data acquired using either randomly-varying delays or continuously-varying delays for the sub-source firing times. In contrast, the conventional technology for removing the source ghost cannot be applied on seismic data acquired using continuously-varying time-delays.

Figure 7:
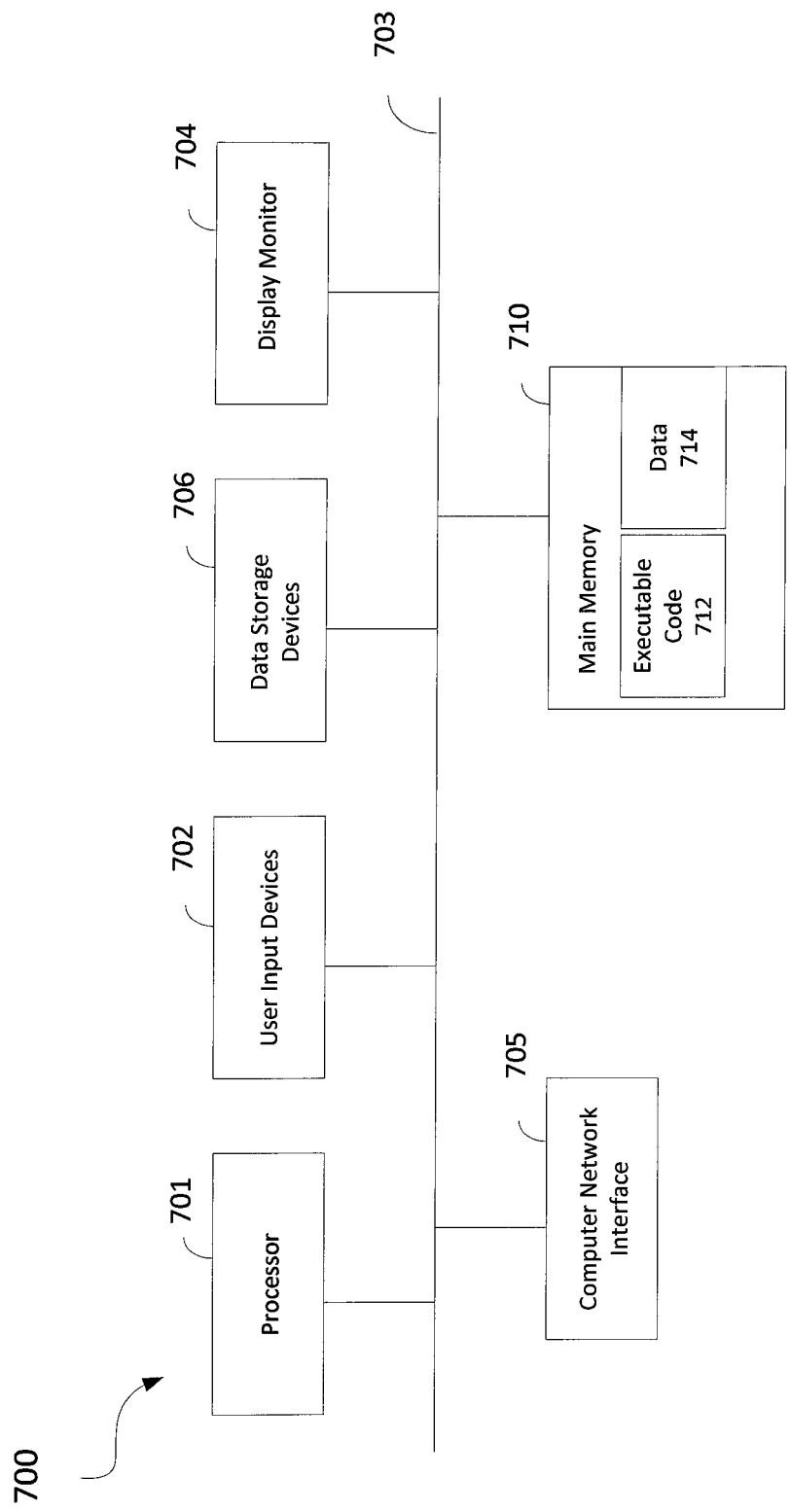
FIG. 7 shows an example computer apparatus which may be used in performing the method for the deghosting of seismic data in accordance with an embodiment of the invention.

FIG. 7 shows an example computer apparatus 700 which may be used in performing the method for deghosting of seismic data in accordance with an embodiment of the invention. The computer apparatus 700 may be configured with executable instructions so as to perform the data processing methods described herein. This figure shows just one example of a computer which may be used to perform the data processing methods described herein. Many other types of computers may also be employed, such as multi-processor computers, server computers, cloud computing via a computer network, and so forth.

The computer apparatus 700 may include a processor 701, such as those from the Intel Corporation of Santa Clara, Calif., for example. The computer apparatus 700 may have a bus system 703 communicatively interconnecting its various components. The computer apparatus 700 may include one or more user input devices 702 (e.g., keyboard, mouse), a display monitor 704 (e.g., LCD, flat panel monitor, CRT), a computer network interface 705 (e.g., network adapter, modem), and a data storage system which may include one or more data storage devices 706 (e.g., hard drive, solid state memory, optical disk drive, USB memory) and a main memory 710 (e.g., RAM).

In the example shown in this figure, the main memory 710 includes executable code 712 and data 714 stored therein The executable code 712 may comprise computer-readable program code (i.e., software) components which may be loaded from the data storage device 706 to the main memory 710 for execution by the processor 701. In particular, the executable code 712 may be configured to perform computer-implemented steps in the methods described herein. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deghosting seismic data from a marine seismic survey, the method comprising:
   obtaining the seismic data from the marine seismic survey, wherein a source for the marine seismic survey comprises multiple sub-sources towed at two or more different depths and fired at distinct fire-time delays;
   sorting the seismic data into common receiver gathers;
   transforming the common receiver gathers from a space-time domain that includes horizontal source coordinates to a frequency-wavenumber domain that includes horizontal wavenumbers;
   constructing a matrix operator for a selected frequency;
   applying an inversion procedure to a system of equations based on the matrix operator to generate source-deghosted seismic data at the selected frequency;
   changing the selected frequency and repeating said constructing and said applying for a range of frequencies;
   transforming the source-deghosted seismic data from the frequency-wavenumber domain to the space-time domain; and
   using the source-deghosted seismic data for determining structures of a subsurface rock formation.

2. The method of claim 1, wherein the matrix operator comprises an inverse spatial Fourier transform operator, a time-delay phase-shift operator per sub-source, and a ghost operator per sub-source.

3. The method of claim 2, wherein the matrix operator further comprises a summation over all sub-sources of a product of the ghost operator per sub-source and the time-delay phase-shift operator per sub-source.

4. The method of claim 2, wherein the ghost operator per sub-source comprises a sinusoidal of a product of a vertical wave number and the depth of the sub-source.

5. The method of claim 1, wherein each sub-source of the multiple sub-sources has a fire-time delay that is distinct in that the fire-time delay for the sub-source is different from the fire-time delays of other sub-sources.

6. The method of claim 5, wherein the matrix operator comprises a time-delay phase-shift operator per sub-source, and wherein the time-delay phase-shift operator per sub-source comprises a phase shift that is proportional to the fire-time delay of the sub-source.

7. The method of claim 1, wherein the matrix operator comprises a summation over all sub-sources of a product of a ghost operator per sub-source and a time-delay phase-shift operator per sub-source, each sub-source has a fire-time delay that is different from the fire-time delays of other sub-sources, the time-delay phase-shift operator per sub-source comprises a phase shift that is proportional to the fire-time delay of the sub-source, and the ghost operator per sub-source comprises a sinusoidal of a product of a vertical wave number and the depth of the sub-source.

8. The method of claim 1, wherein an expression of the system of equations comprises a first vector of seismic data that is equal to a vector product of the matrix operator and a second vector of seismic data, wherein the inversion procedure solves for the second vector of seismic data.

9. An apparatus for deghosting seismic data from a marine seismic survey, the apparatus comprising:
   memory configured to store processor-executable code and data;
   a processor configured to execute the computer-readable code so as to modify the data;
   computer-readable code configured to sort seismic data from a marine seismic survey into common receiver gathers, wherein a source for the marine seismic survey comprises multiple sub-sources towed at two or more different depths and fired at distinct fire-time delays;
   computer-readable code configured to transform the common receiver gathers from a space-time domain that includes horizontal source coordinates to a frequency-wavenumber domain that includes horizontal wavenumbers;
   computer-readable code configured to construct a matrix operator for a selected frequency;
   computer-readable code configured to apply an inversion procedure to a system of equations based on the matrix operator to generate source-deghosted seismic data at the selected frequency;
   computer-readable code configured to change the selected frequency and repeat said construction of the matrix operator and said application of the inversion procedure for a range of frequencies;
   computer-readable code configured to transform the source-ghosted seismic data from the frequency-wavenumber domain to the space-time domain; and
   computer-readable code configured to output the source-deghosted seismic data for use in determining structures of a subsurface rock formation.

10. The apparatus of claim 9, wherein the matrix operator comprises an inverse spatial Fourier transform operator, a time-delay phase-shift operator per sub-source, and a ghost operator per sub-source.

11. The apparatus of claim 10, wherein the matrix operator further comprises a summation over all sub-sources of a product of the ghost operator per sub-source and the time-delay phase-shift operator per sub-source.

12. The apparatus of claim 10, wherein the ghost operator per sub-source comprises a sinusoidal of a product of a vertical wave number and the depth of the sub-source.

13. The apparatus of claim 10, wherein each sub-source of the multiple sub-sources has a fire-time delay that is distinct in that the fire-time delay for the sub-source is different from the fire-time delays of other sub-sources.

14. The apparatus of claim 13, wherein the time-delay phase-shift operator per sub-source comprises a phase shift that is proportional to the fire-time delay of the sub-source.

15. The apparatus of claim 9, wherein the matrix operator comprises a summation over all sub-sources of a product of a ghost operator per sub-source and a time-delay phase-shift operator per sub-source, each sub-source has a fire-time delay that is different from the fire-time delays of other sub-sources, the time-delay phase-shift operator per sub-source comprises a phase shift that is proportional to the fire-time delay of the sub-source, and the ghost operator per sub-source comprises a sinusoidal of a product of a vertical wave number and the depth of the sub-source.

16. The apparatus of claim 9, wherein an expression of the system of equations comprises a first vector of seismic data that is equal to a vector product of the matrix operator and a second vector of seismic data, wherein the inversion procedure solves for the second vector of seismic data.

17. At least one non-transitory tangible computer-readable storage medium with executable code stored thereon which, when executed by one or more processors, performs steps comprising:
   obtaining the seismic data from the marine seismic survey, wherein a source for the marine seismic survey comprises multiple sub-sources towed at two or more different depths and fired at distinct fire-time delays;
   sorting the seismic data into common receiver gathers;
   transforming the common receiver gathers from a space-time domain that includes horizontal source coordinates to a frequency-wavenumber domain that includes horizontal wavenumbers;
   constructing a matrix operator for a selected frequency;
   applying an inversion procedure to a system of equations based on the matrix operator to generate source-deghosted seismic data at the selected frequency;
   changing the selected frequency and repeating said constructing and said applying for a range of frequencies;
   transforming the source-deghosted seismic data from the frequency-wavenumber domain to the space-time domain; and
   using the source-deghosted seismic data for determining structures of a subsurface rock formation.

18. The at least one non-transitory tangible computer-readable storage medium of claim 17, wherein the matrix operator comprises an inverse spatial Fourier transform operator, a time-delay phase-shift operator per sub-source, and a ghost operator per sub-source.

19. The at least one non-transitory tangible computer-readable storage medium of claim 18, wherein the matrix operator further comprises a summation over all sub-sources of a product of the ghost operator per sub-source and the time-delay phase-shift operator per sub-source.

20. The at least one non-transitory tangible computer-readable storage medium of claim 17, wherein each sub-source of the multiple sub-sources has a fire-time delay that is distinct in that the fire-time delay for the sub-source is different from the fire-time delays of other sub-sources.

* * * * *